United States Patent [19]
Gaeddert et al.

[11] 3,968,633
[45] July 13, 1976

[54] ROUND BALE FORMING MACHINE FOR LIGHT CROP MATERIALS

[75] Inventors: Melvin Victor Gaeddert, Newton; Bobby Dwayne McWhirt, Hesston, both of Kans.

[73] Assignee: Hesston Corporation, Hesston, Kans.

[22] Filed: Dec. 5, 1974

[21] Appl. No.: 529,739

Related U.S. Application Data

[63] Continuation-in-part of Ser. No. 511,215, Oct. 2, 1974.

[52] U.S. Cl. .................................................. 56/341
[51] Int. Cl.² .......................................... A01D 75/00
[58] Field of Search ............... 56/341, 343, 1, 16.4; 172/19

[56] References Cited
UNITED STATES PATENTS

| | | | |
|---|---|---|---|
| 3,763,636 | 10/1973 | Bliss | 56/341 X |
| 3,815,344 | 6/1974 | Kucera | 56/341 |

*Primary Examiner*—Hugh R. Chamblee
*Assistant Examiner*—J. N. Eskovitz
*Attorney, Agent, or Firm*—Schmidt, Johnson, Hovey & Williams

[57] ABSTRACT

A machine for producing large round bales passes over loose hay on the ground, picks up the hay adjacent the rear of the machine and coils the hay within a forming chamber as the bale is rolled along the ground to progressively grow in size until reaching its final dimensions, whereupon the bale is tied and the endgate of the machine is raised to discharge the finished bale. The bale forming chamber of the machine is defined by a pair of upwardly concave, front and rear forming grates that swing upwardly in opposite directions under resistance as the bale grows in size so as to apply yieldable compacting pressure to the growing bale, the front forming grate being suspended by swingable hangers that also allow it to be displaced forwardly at the same time that it swings upwardly against the action of the growing bale. Another smaller rear forming grate, also upwardly concave, is located within the forming chamber below the other rear forming grate and serves to contain, compact and initiate rolling of the hay mass that accumulates below the smaller grate at the beginning of the formation process, such lower grate being particularly beneficial in conditions of light or short crop materials. The two rear grates are provided with a spring-loaded connection therebetween so that the lower, smaller grate can swing independently of the larger rear grate during initial stages of the bale formation, and yet both rear grates can be raised to their fullest extents in unison when the endgate of the housing is raised, thereby permitting the rear grates to be moved together into positions relieving pressure on the finished bale as it is discharged from the rear of the machine.

4 Claims, 8 Drawing Figures

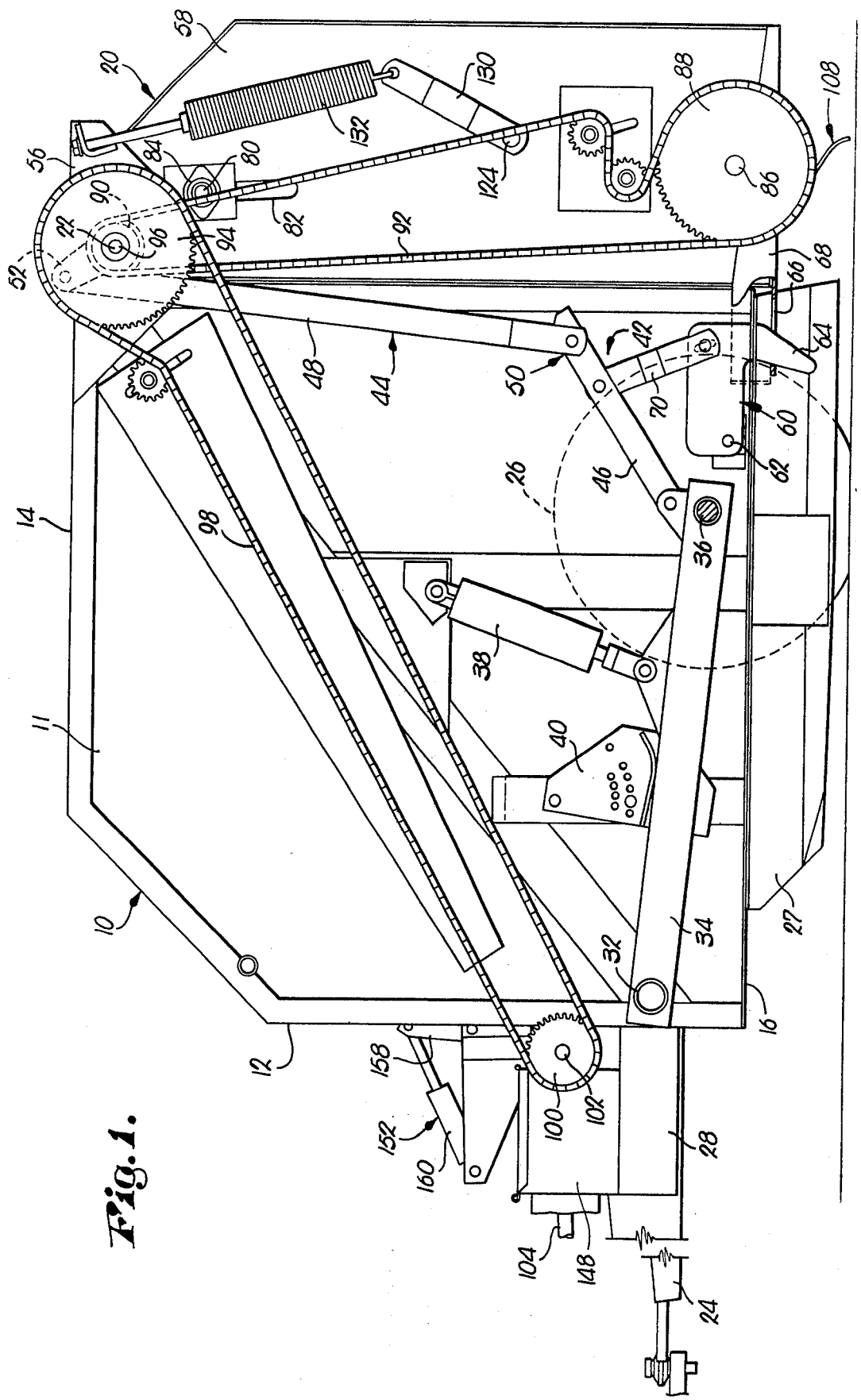

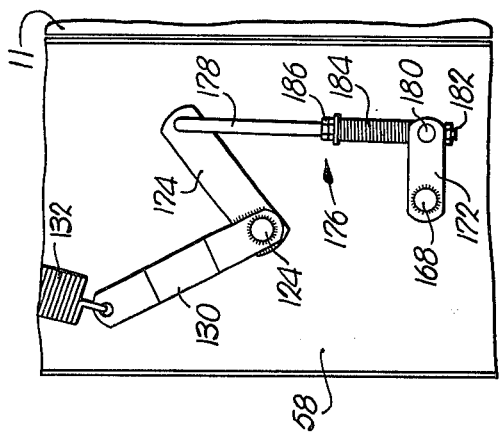
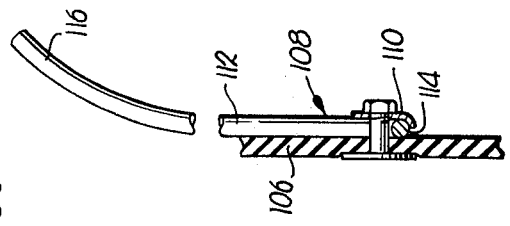
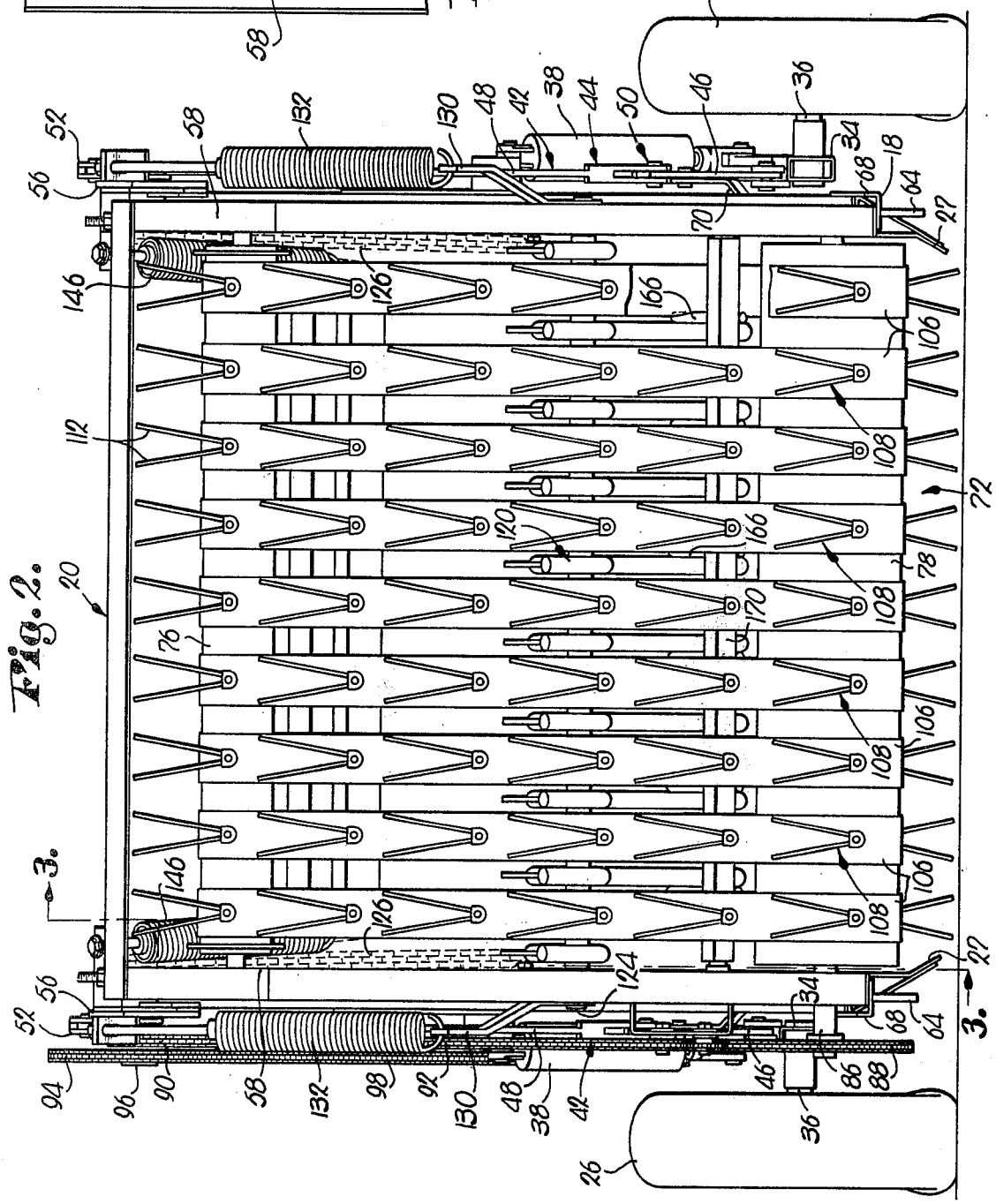

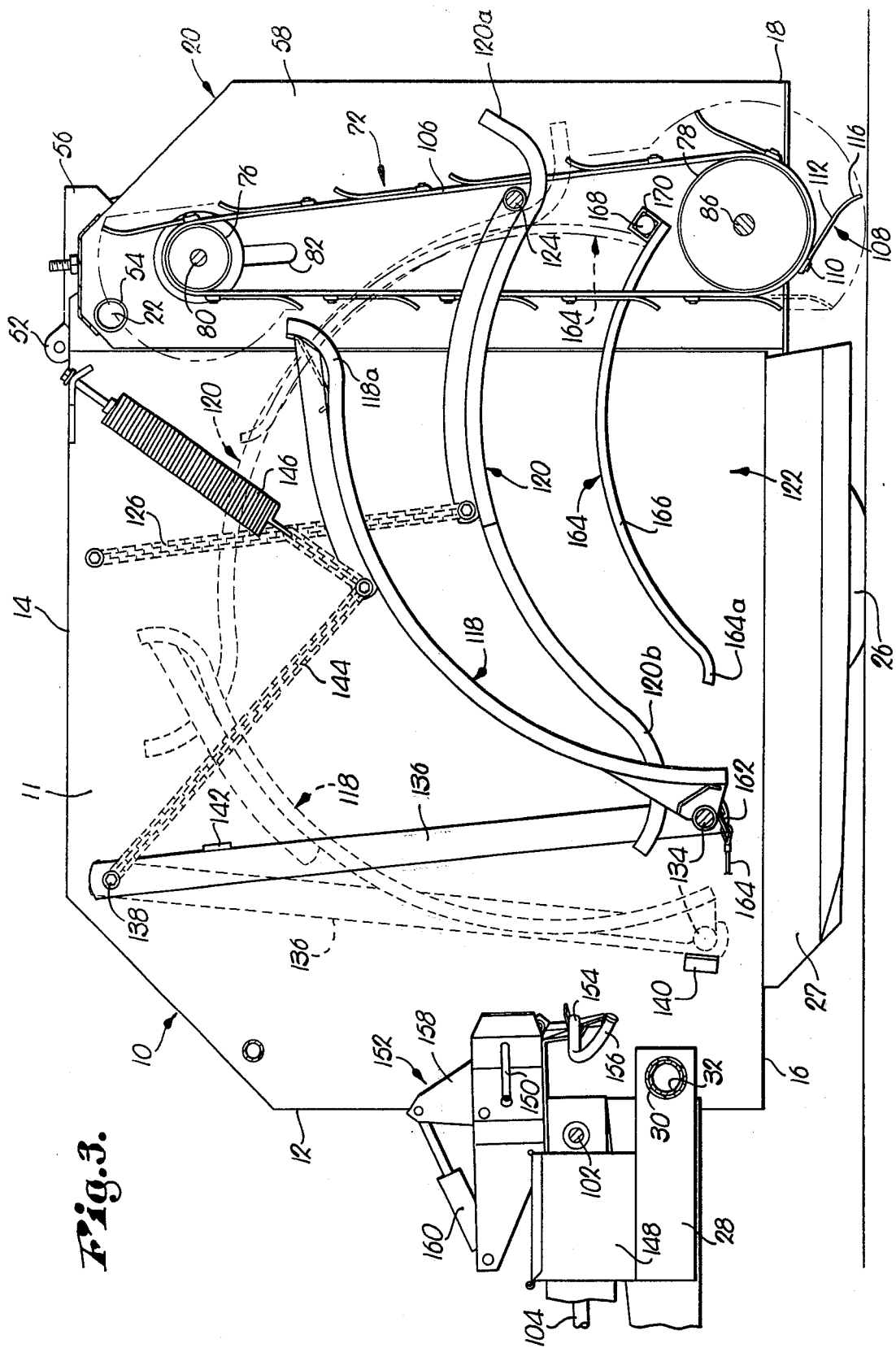

ROUND BALE FORMING MACHINE FOR LIGHT CROP MATERIALS

CROSS REFERENCES

This is a continuation-in-part of our copending application titled "Machine For Forming Round Bales", Ser. No. 511,215, filed Oct. 2, 1974.

This invention relates broadly to the field of hay handling and, more particularly, to the formation of relatively large cylindrical hay bales, commonly referred to in the industry as "round" bales. Hence, the description which follows is couched in terms of round bales, although it is to be understood that such terminology does in fact refer to cylindrical bales having circular or round cross sections. Moreover, the present invention relates to that class of large round balers wherein a bale is formed by rolling a mass of hay along ground covered with loose hay so as to coil or roll up the bale as the latter is pushed along the ground.

One important object of the present invention is to provide a further refinement of the machine disclosed and claimed in the aforesaid application, such refinement being directed toward assuring that in light, relatively less dense or shorter crop conditions the mass of hay which forms the core of the finished bale is initially contained properly and caused to roll in the proper manner under pressure to provide a firm core around which the remainder of the bale can be coiled.

More specifically, it is an important object of this invention to provide, in combination with special front and rear forming grates wherein the front grate is swingable not only about a transverse, horizontal axis but is also bodily displaceable in a fore-and-aft direction as the bale grows in size, a relatively small, rear forming grate that underlies the other rear forming grate and operates independently of such other rear grate to very quickly initiate rolling of the beginning mass of hay that accumulates beneath the smaller rear grate.

A further important object of this invention is to arrange the extra lower, rear forming grate so that it does not interfere with the function of the two main forming grates after the bale has grown to a predetermined size.

A still further important object of this invention is to provide a yieldable connection between the upper and lower rear forming grates which allows the lower rear forming grate to swing upwardly under resistance independently of the upper rear forming grate and yet causes the two rear grates to be raised in unison as the endgate upon which they are mounted is itself raised to its opened position, thus providing a means by which the rear grates are simultaneously moved to and held in positions which relieve pressure on the finished bale as the latter is discharged from the rear of the machine.

In the drawings:

FIG. 1 is a side elevational view of a machine for forming large round bales constructed in accordance with the teachings of the present invention, the endgate being shown in its fully closed position and the housing fully lowered to its normal working height;

FIG. 2 is an elevational view of the rear of the machine;

FIG. 3 is a vertical, cross-sectional view through the machine taken along line 3—3 of FIG. 2 and showing alternative positions of the front and rear forming grates in dashed lines;

FIG. 5 is an enlarged, fragmentary elevational view of the apparatus on one side of the endgate that operably interconnects the two rear grates;

FIG. 6 is an enlarged, fragmentary, vertical cross-scetional view through the pickup mechanism showing details of a lifting tine;

Figure 8:
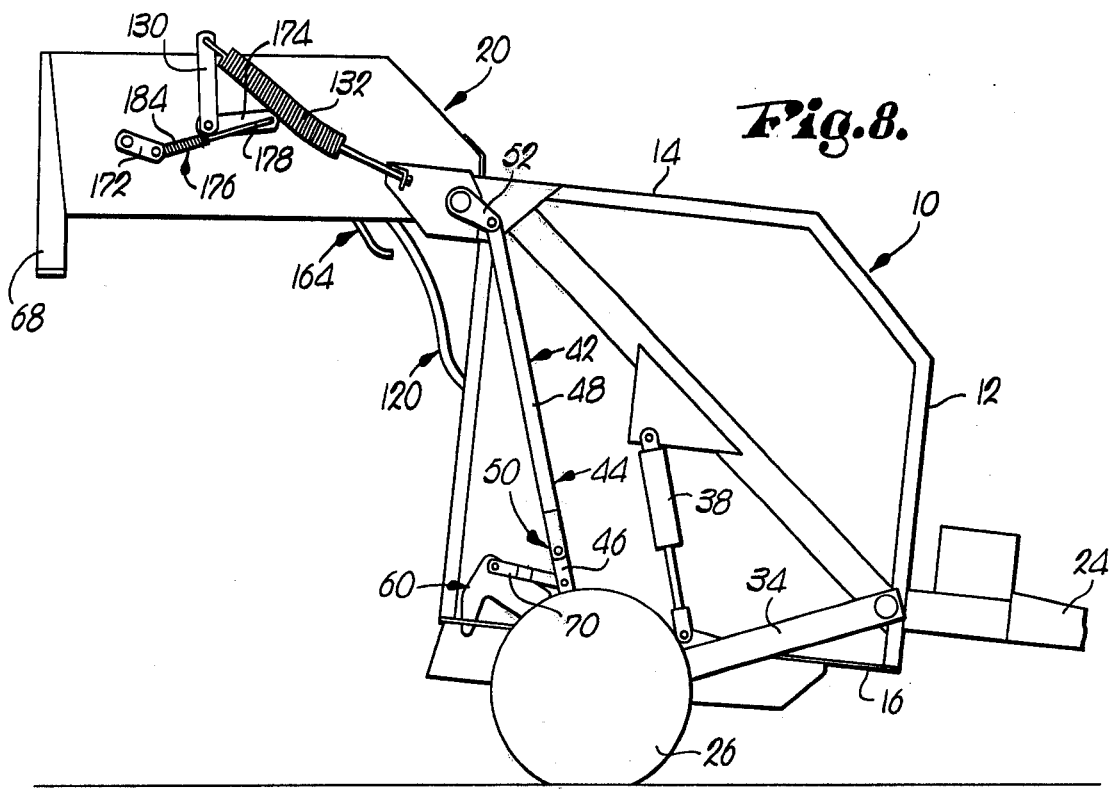
FIG. 8 is a schematic view similar to FIG. 7 but showing the endgate fully opened.

The baling machine of the present invention has a box-like housing 10 provided with opposed sidewalls 11. It is open along its front 12, top 14 and bottom 16, and is normally closed at its rear 18 by an endgate 20 which may be swung about a horizontal axis at 22 between a position fully closing rear 18 as shown, for example, in FIG. 1, and a position fully opening rear 18 as shown in FIG. 8. A tongue 24 at the front 12 of housing 10 adapts the latter for coupling with a towing vehicle (not shown), and a pair of ground wheels 26 on opposite sides of housing 10 adapt the latter for advancement across a field. Depending, fore-and-aft extending shields 27 on each sidewall 11 along bottom 16 help confine loose hay as housing 10 passes thereover during operation.

The housing 10 is secured to a forwardmost frame 28 at the rear of tongue 24 which includes a cross pipe 30 (FIGS. 3 and 4) extending transversely of the normal path of travel of the machine across the front 12 of housing 10 adjacent bottom 16. Pipe 30 rotatably houses a tube 32 which projects outwardly beyond opposite sidewalls 11 and is there rigidly secured to a pair of rearwardly extending lift arms 34 having stub shafts 36 at their rearmost ends which rotatably support the ground wheels 26. A fluid pressure piston and cylinder assembly 38 on each side respectively of housing 10 interconnects the corresponding lift arm 34 and the corresponding sidewall 11 to provide powered raising and lowering of housing 10 when assemblies 38 are actuated. The lower limit of swinging of housing 10 is defined by an adjustable stop plate 40 for each arm 34 respectively which engages its arm 34 when housing 10 is fully lowered as in FIG. 1.

Opening and closing of endgate 20 is controlled by apparatus 42 on each side respectively of housing 10 which includes lost motion linkage 44 that interconnects the rearmost end of the corresponding lift arm 34 and endgate 20. More specifically, each linkage 44 is articulated having a pair of links 46 and 48 which are pivotally interconnected to form a joint 50, the lower link 46 being pivotally connected to its lift arm 34 and the upper link 48 being pivotally connected at its upper end to a crank 52 also forming a part of each apparatus 42. Each crank 52 is rigidly affixed to a transversely extending stub pipe 54 that is rotatable within a gusset 56 yet is rigidly secured to a proximal sidewall 58 of endgate 20 such that operation of cranks 52 effects swinging of endgate 20 about the horizontal axis 22 defined by stub pipes 54.

Each linkage 44 is of such a length that joint 50 is bent when housing 10 is fully lowered as shown in FIG. 1. Consequently, extension of the piston and cylinder assemblies 38 to raise housing 10 has the effect of straightening joints 50, but such movement has no effect upon endgate 20 unless cylinders 38 continue to be actuated beyond that point at which the joints 50 become fully straightened. Hence, a degree of lost motion is involved, insofar as actuation of endgate 20 is concerned, as the linkages 44 are buckled and unbuckled during raising and lowering of housing 10 to a limited extent.

Each side of the housing 10 is provided with a latch 60 for endgate 20 which is also controlled by manipulation of the lift arms 34. Each latch 60 has a pivotal connection 62 at its forwardmost end to the proximal sidewall 11 and is provided with an integral, depending tongue 64 at its rearmost end that is adapted to be received within an elongated slot 66 (FIG. 1) within a forwardly projecting bar 68 on endgate 20. A short link 70 operably connects each latch 60 respectively with the lower link 46 of corresponding linkage 44 such that movement of the linkages 44 is transmitted directly to the latches 60. As illustrated, each tongue 64 is considerably prolonged such that it remains within slot 66 of the corresponding bar 68 during considerable movement of linkage 44. In this respect the tongues 64 remain within their slots 66 at least until the linkages 44 are in the condition illustrated in FIG. 7, where they are slightly buckled, and housing 10 is raised significantly to facilitate roading. As each joint 50 is straightened beyond the condition in FIG. 7 and its linkage 44 unbuckles, however, the corresponding latch 60 releases endgate 20 so that the latter can be fully raised to its FIG. 8 position upon continued extnesion of the piston and cylinder assemblies 38.

Figure 4:
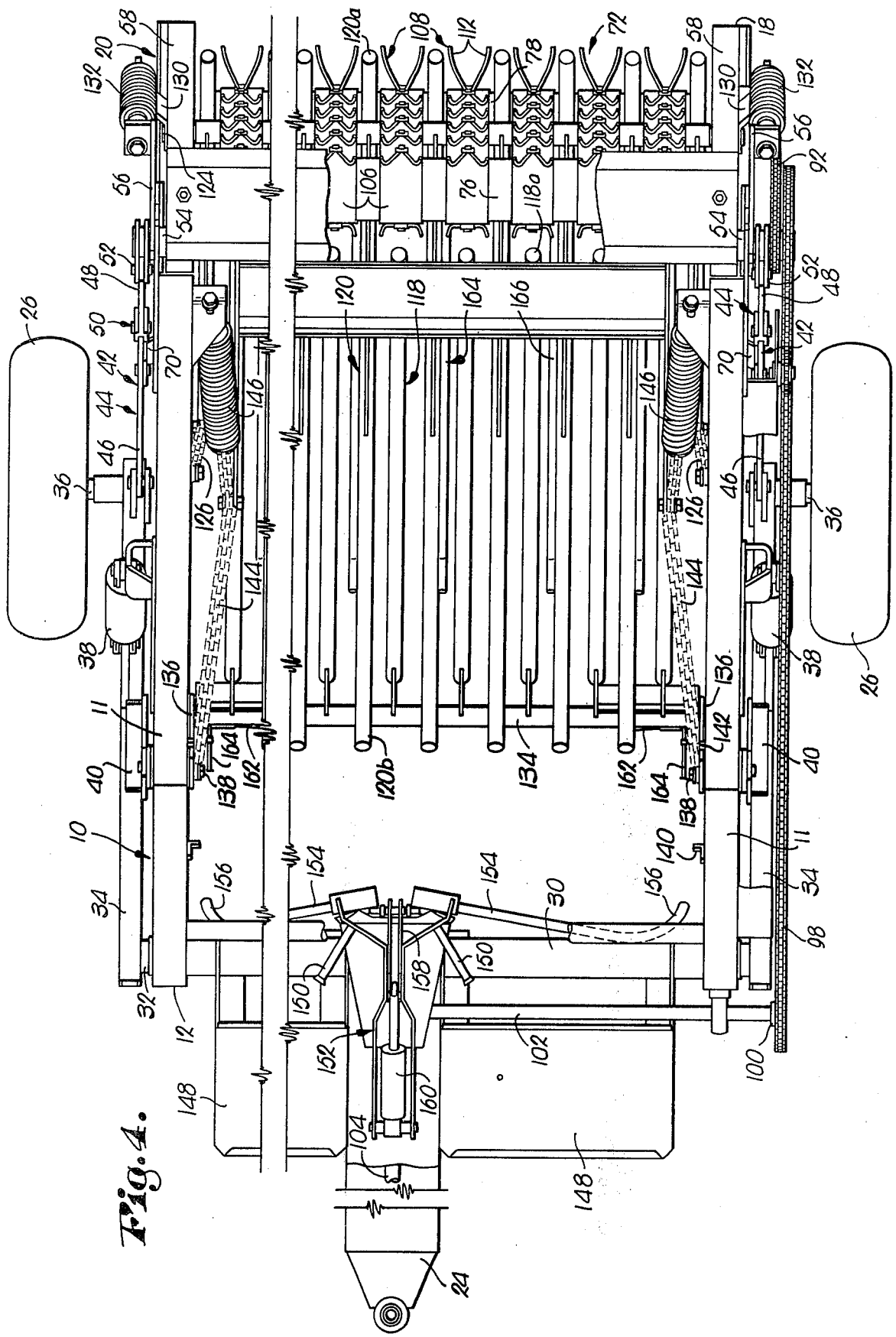
FIG. 4 is a top plan view of the machine.

The endgate 20 carries pickup mechanism 72 that is essential not only in raising loose hay from the ground as housing 10 passes thereover, but is also important in imparting a rolling action to the mass of hay that is being formed into a bale within the housing 10. Mechanism 72 includes a pair of upper and lower rotatable drum members 76 and 78 which span the endgate 20 and are supported by its sidewalls 58 for rotation about horizontal axes transverse to the normal path of travel of housing 10. The upper drum 76 has a central shaft 80 extending through a vertically disposed slot 82 in each sidewall 58 and supported at its outer ends by bearings 84 (FIG. 1, only one being shown) which are releasably secured to sidewalls 58 to permit vertical adjustment of shaft 80 within slots 82. The lower drum 78 has a central shaft 86 which is journaled for rotation by suitable bearings (not shown) within sidewalls 58, and shaft 86 projecting outwardly beyond the left sidewall 58 (viewing FIG. 2) where it is affixed to a large sprocket 88 (FIGS. 1, 2 and 4). Sprocket 88 is in turn drivingly coupled with a smaller upper sprocket 90 on sidewall 58 by an endless chain 92. The small sprocket 90 is part of a double sprocket which also includes a larger outer sprocket 94 mounted on a common shaft 96 which is concentric to and rotatable within the corresponding stub pipe 54 associated with crank 52. A long, fore-and-aft extending, continuous drive chain 98 drivingly couples large sprocket 94 with another sprocket 100 at the front 12 of housing 10 which is carried by a transverse shaft 102 that makes a right-angle connection (not shown) to a main fore-and-aft extending input shaft 104 couplable with the power takeoff mechanism or the like of the towing vehicle.

Mechanism 72 further includes a flexible, continuous web looped around drums 76 and 78 in the nature of a plurality of side-by-side flexible belts 106. Each continuous belt 106 carries a series of bifurcated, elongated lifters 108, each of which is fastened at one end only to its belt 106 by a fastener 110 (detailed in FIG. 6). Each lifter 108 normally lies flatly against its belt 106 and is held rather tightly thereagainst by its fastener 110, but the opposite end of each lifter 108 is free to move outwardly with respect to the surface of its belt 106. Hence, as illustrated best in FIG. 3, the lifters 108 are caused to be projected outwardly from their belts 106 at their free ends as lifters 108 move around lower drum 78, and such outward projection continues until the lifters 108 are agin positioned along a flat stretch of their belt 106 rather than an arcuate stretch around drum 78. Drum 78 is rotated in a clockwise direction viewing FIGS. 1 and 3, and hence the rearmost stretches of belts 106 are moving downwardly while the forwardmost stretches thereof are moving upwardly such that the lifters 108 are caused to sweep forwardly and upwardly about drum 78 when they are adjacent the ground as shown in FIG. 3.

Each lifter 108 is generally V-shaped, having a pair of tines 112 which converge toward their fastener 110 and are interconnected therebeneath by a bight 114 (FIG. 6). The opposite ends of tines 112 terminate in outturned tips 116 that insure aggressive sweeping and raking action as the tines 112 move around lower drum 78.

With particular reference to FIGS. 3 and 4, it may be seen that the interior of housing 10 contains a pair of upwardly concave, bale-forming grate elements 118 and 120 which together form the arcuate top of an expandable forming chamber 122 below grates 118, 120, ahead of mechanism 72, and above open bottom 16. The rear grate 120 is mounted for swinging movement with a transversely extending, horizontal shaft 124 that is supported by the opposed sidewalls 58 of endgate 20, the bulk of grate 120 thus extending forwardly from mechanism 72. Rear grate 120 is provided with an upturned rearmost extremity 120a that extends rearwardly between adjacent belts 106 to maintain the same in separated relationship to one another, while the front of rear grate 120 is provided with a similarly upturned forwardmost extremity 120b. A pair of limit chains 126 restrict downward swinging of rear grate 120 beyond its full line position shown in FIG. 3, and a pair of external cranks 130 are fixed to the outermost opposite ends of shaft 124 and are coupled with tension spring 132 to yieldably bias rear grate 120 downwardly against the lower stop provided by limit chain 126.

Front grate 118, on the other hand, while being configured somewhat similarly to rear grate 120 in that it is also provided with an upturned, forwardmost extremity 118a, is swingably mounted on a transversely extending shaft 134 located adjacent bottom 16 which can itself be shifted fore-and-aft of housing 10 by virtue of elongated, upright hangers 136 on opposite sides of housing 10 that depend from upper pivots 138 in sidewalls 11. Hangers 136 are limited in their opposite extremes of fore-and-aft swinging movement by stops 140 and 142 secured to the sidewalls 11, and the front grate 118 is limited in the extent of downward swinging movement which it may make by virtue of a pair of limit chains 144. A pair of coiled tension springs 146 inclined downwardly and forwardly within housing 10 yieldably bias grate 118 downwardly toward bottom 16 and restrain the same with its hangers 136 against movement forwardly to the dashed line position shown in FIG. 3.

As can be clearly seen, the orientation of front grate 118, whose individual rods are interspersed between those of rear grate 120, is considerably more upright than rear grate 120. That is, as can be seen by comparing the solid line and dashed line positions of grate 118 as shown in FIG. 3, the disposition of front grate 118 throughout its operations is primarily vertical so as to form the front limit of the defined top of forming chamber 122. In its solid line position of FIG. 3, which is the condition during the most initial stages of bale formation, the shaft 134 of front grate 118 is disposed below front extremity 120b of rear grate 120 with the remaining portion of grate 118 extending upwardly through and beyond rear grate 120. In this condition, the front grate 118 thus foreshortens the top of forming chamber 122 which would extend forwardly to the front extremity 120b of rear grate 120 were it not for the presence of shaft 134 below forward extremity 120b at this particular time. As front grate 118 swings forwardly about shaft 134 and as hangers 136 swing forwardly about their pivots 138 to the dotted line position of FIG. 3, the foreshortened chamber 122 is expanded in a fore-and-aft direction as well as in a vertical direction.

The frame 28, located ahead of front 12 of housing 10, supports a pair of receptacles 148 which house cord or other suitable material for binding the finished bale before it leaves the forming chamber 122. Single strands of cord (not shown) are threaded through a pair of outwardly angled, generally fore-and-aft extending tubes 150 of tying mechanism 152 and thence into oppositely extending, normally horizontal, tubular guides 154 provided with rearwardly curved ends 156. The strands of cord hang freely from ends 156 and are brought toward and away from the central axis of the machine by guides 154 when the latter are swung downwardly about generally fore-and-aft axes into contiguous relationship with one another by a common rocker 150 which is operated by a hydraulic cylinder 160. Cylinder 160 may, if desired, be actuated by an electric motor (not shown) such that the tying mechanism 152 may be operated simply by throwing an appropriate switch.

The foregoing description of the machine is substantially as contained in our prior copending application identified earlier. The machine as thus described has performed admirably under many varying crop conditions and thus is well adapted to handle most crop conditions with which it may be confronted. However, it has been found that the structures now to be described are of particular benefit where very light and/or short crop conditions prevail such as, for example, where straw is to be baled. Under such circumstances, these structures may be added to the basic machine, such as in the form of a kit, and will provide assistance in assuring that the bale core is initially confined and controlled in the proper manner to start almost immediate rolling of the bale core and to provide a firm center about which the remainder of the bale may be coiled.

With reference initially to FIG. 3, an additional, smaller rear grate element 164 is provided that is located below the other rear grate 120 in vertically spaced relationship thereto. The smaller grate 164 is upwardly concave as is the larger grate 120, and in other respects the smaller grate 164 is quite similar to larger rear grate 120. More specifically, smaller grate 164 is of grid construction having a series of fore-and-aft extending, laterally spaced apart, arcuate rods 166 that are only slightly visible in FIG. 2, such rods 166 being in registration with the spaces between the rods of rear grate 120. The forwardmost end of rear grate 164 terminates in an upturned extremity 164a, while the rear of grate 164 is devoid of such upturned structure.

Grate 164 is, of course, disposed closer to bottom 16 of housing 10 then the other rear grate 120 and is mounted for vertical swinging movement about a horizontal, transverse axis defined by a shaft 168 that spans the sidewalls 58 of endgate 20 and is journaled thereby. Square tubing 170 houses shaft 168 and provides a convenient mount for the rods 166 to shaft 168. As shown in FIG. 3, the smaller grate 164 is thus adapted to be swung between its fully lowered position illustrated in full lines and a fully raised position illustrated in dotted lines that closely matches the fully raised position of the larger rear grate 120. Of course, because the rods 166 of grate 164 are positioned between the corresponding rods of larger rear grate 120, grate 164 can swing upwardly through grate 120 to a certain extent.

Although not shown in the rear view of the machine appearing in FIG. 2 because other mechanism would interfere with its illustration in that Fig., it is to be understood that apparatus is provided on endgate 20 on the outside of the right sidewall 58 thereof (as shown in FIG. 5) which permits individual actuation of the small grate 164 under certain conditions and causes actuation of both rear grates 120 and 164 in unison under certain other conditions. In this respect the outermost end of shaft 168 shown in FIG. 5 has a small crank 172 affixed thereto, and there is another larger crank 174 affixed to the corresponding end of shaft 124 inboard of crank 130. The two cranks 172 and 174 are joined by a spring-loaded connection 176 that permits the small crank 172 to be rotated counterclockwise viewing FIG. 5 without causing similar rotation of crank 174, and yet connection 176 causes the small crank 172 to be pulled in a counterclockwise direction with the larger crank 174 when the latter is intentionally rotated in a counterclockwise direction viewing FIG. 5.

In particular, the connection 176 includes a rod 178 that is pivotally connected at its uppermost end to the crank 174 and which passes loosely through a cross-member 180 of the crank 172, the latter being bifurcated in nature (not shown) so as to carry the cross-member 180 between opposite furcations. Rod 178 is threaded along the lower half of its length, including that portion that extends through the cross-member 180, and threadably carries one or more nuts 182 on its lowermost end that serve as a stop means by engaging the cross-member 180 so as to prevent rod 178 from being pulled upwardly through and free of cross-member 180. Hence, when crank 174 is rotated counterclockwise viewing FIG. 5, the smaller crank 172 must follow suit as the nuts 182 engage the cross-member 180.

On the other hand, the crank 172 may itself be rotated counterclockwise without corresponding counterclockwise rotation of crank 174 because rod 178 can extend downwardly through cross-member 180 as crank 172 swings upwardly and rod 178 remains stationary. Such counterclockwise rotation of crank 172 relative to crank 174 is, however, resisted by a coil spring 184 that surrounds rod 178 along the lower length thereof and is disposed between the cross-member 180 and a pair of nuts 186. Nuts 186 may, of course, be threaded along rod 178 in the appropriate direction to either reduce or increase the resistance to independent, counterclockwise rotation of crank 172.

OPERATION

Housing 10 is advanced in the lowered position shown in FIGS. 1–4 over ground having loose crop material lying thereon, preferably in a windrow. In this position the tines 112 of lifters 108 flip outwardly about their fasteners 110 and sweep in close proximity to the ground surface as they move around lower drum 78 in a clockwise direction viewing FIG. 3. Should it be necessary to adjust the position of tines 112 relative to the ground surface, such can be readily accomplished by merely actuating the piston and cylinder assemblies 38 to the extent necessary to raise housing 10 an apprropriate amount.

As the open bottom 16 of housing 10 passes over the loose material, the lifters 108 engage the material and sweep it upwardly and forwardly into chamber 122 where it encounters the small rear grate 164 in the position of FIG. 3 and is caused to roll forwardly in a tumbling action. Upward swinging of grate 164 is resisted at this time by coil spring 184 (FIG. 5), and thus the rolling mass of material begins to be compacted by grate 164 into a firm bale core as more and more material accumulates beneath grate 164. After the bale core has reached such a size that it simply can no longer be maintained within the limited space below grate 164, the latter yields upwardly in a clockwise direction viewing FIG. 3 against the resistance of coil spring 184 as the latter becomes progressively compressed between nuts 186 and cross-member 180, thus causing continuous compacting pressure to be applied against the rolling material as it grows in size. It should be noted at this juncture that because the large coil spring 132 in FIG. 5 is considerably stronger than the small spring 184, the latter yields rather than spring 132 as grate 164 seeks to swing upwardly, hence maintaining large rear grate 120 stationary at this stage of the forming process.

Small grate 164 continues to swing upwardly and rearwardly, and as it reaches large grate 120 the rods 166 of the grate 164 slip between those of grate 120 such that the rolling bale begins to contact grate 120 and be controlled thereby. From this point on in the forming process the small grate 164 exerts no independent control over the growing bale, such now coming from the combined efforts of all three grates 118, 120 and 164 as they swing upwardly under resistance and in unison to properly compact the growing bale. In this respect, it is to be noted that because large rear grate 120 is now yielding to the growing bale, its crank 174 which backs up spring 184 is also moving such that small grate 164 swings willingly with large grate 120 rather than having any tendency to remain behind and exert a greater pressure against the bale than that exerted by large grate 120.

The front grate 118 across the front of chamber 122 foreshortens the latter to such an extent that the bale core rolling within chamber 122 is maintained in a single core of material rather than separating into two or more separate groups. Hence, the bale grows in size about a single core to assume a truly circular cross-sectional configuration, rather than taking on an elliptical shape provided with bunches of material at opposite sides of the main circular mass. The latter arrangement is highly undesirable because a bale thus formed is difficult to retain against break up or cracking, with the result that moisture can readily enter the bale and ruin its quality. Moreover, the production of such an elliptical bale makes tying of the bale more difficult, as well as making the bale harder to roll smoothly along the ground during other handling.

It is also to be pointed out that the springs 146 coupled with front grate 118 assure that substantial resistance to forward movement of the core within chamber 122 is provided during the initial stages of bale formation. Pressure is applied by grate 118 not only downwardly against the bale, but also rearwardly against the same so that there is little tendency for the bale to assume other than a truly circular configuration during such initial stages. Moreover, the bale core is assured of being tightly packed, without undue fluffiness, which is highly important from the standpoint of producing a bale in the most efficient manner and with the best weather-shedding characteristics.

Should the lifters 108 encounter stones, stubble, or the like during their movement around drum 78, such does not lead to damage or breakage as has heretofore been a consistent problem in previous machines utilizing "star wheel" type pickups. Instead, the lifters 108 simply yield rearwardly on their belts 106 or even twist to one side as required to allow the stones or stubble to pass rearwardly beyond endgate 20. In addition, it has been found after considerable field testing in rocky soil conditions that the lifters 108 do not pick up stones and other trash to be rolled into the bale as has heretofore been prevalent in prior machines. While lifters 108 are extremely effective in sweeping the loose hay forwardly and upwardly into the forming chamber 122, they are equally as effective in leaving behind the undesirable trash materials that otherwise serve only to lower the quality of the bale being formed.

After the bale has been coiled to the desired size and grates 118, 120 and 164 and hangers 136 have all swung to their respective outer limits, the bale is ready to be tied. Hence, as the last layer of hay is being coiled about the bale, the operator actuates hydraulic cylinder 160 to swing rocker 158 forwardly so as to bring the guides 154 downwardly into a generally vertical, contiguous relationship with one another. This presents the free ends of the binding cord to the loose crop material as it is being rolled up onto the bale, thereby pulling the cord through guides 154 and initiating wrapping of the cord about the bale. The operator then directs the machine out of the material onto a clear ground surface and continues to advance housing 10 such that the formed bale continues to roll within expanded chamber 122, causing the cord from guides 154 to be wound around the bale. As such winding takes place, the guides 154 are swung back and forth toward and away from the center of the machine by cylinder 160 so that the bale becomes wrapped not only at its center but also adjacent both ends. When the bale has been sufficiently wrapped with cord and the guides 154 are swung outwardly to their fullest extent, the cords will be disposed along shaft 134 of front grate 118 adjacent a pair of shiftable sickle sections 162. Actuation of sections 162 by a pair of cables 164 causes the cords to be severed, completing the tying procedure.

In order to discharge the bound bale from chamber 74, it is necessary that the endgate 20 be raised to its position illustrated in FIG. 8. Such is accomplished by extending the piston and cylinder assemblies 38 to raise housing 10 and straighten the joints 50 of lost motion linkages 44. As such straightening occurs, the latches 60 are pulled from slots 66 on endgate 20, all without attempting to force endgate 20 out of its fully closed position. Once linkages 44 have become fully unbuckled with their joints 50 completely straightened, further extension of piston and cylinder assemblies 38 causes linkages 44 to pull downwardly on cranks 52, hence swinging endgate 20 about axis 22 into the fully raised position of FIG. 8. At this time, the housing 10 may be advanced, leaving the finished and bound bale resting on the ground.

It is interesting and important to note that the forming grates 118, 120 and 164 are quite helpful during discharge of the finished bale, particularly the front grate 118. As endgate 20 is opened and pressure is relieved against the back of the bale, the springs 132, 146 and 184 seek to return grates 118, 120 and 164 to their original solid line positions of FIG. 3, hence shoving the bale rearwardly as housing 10 moves forwardly. Inasmuch as front grate 118 moves practically in a straight line rearwardly to its original position during this procedure, it has the most direct effect on the bale and forcefully ejects the same cleanly and quickly from housing 10.

During the period that the bale is being discharged, which preferably occurs simultaneously with raising of the endgate 20 and forward movement of the housing 10, the rear grates 120 and 164 are limited in the extent to which they can return to their lowered positions, such being desirable in order to prevent any gouging of the bale along the forward, top surface thereof. In this respect, while grates 120 and 164 initially push downwardly and rearwardly on the bale as the endgate 20 begins to open, after a predetermined amount of such opening, the limit chains 126 become taut so that as endgate 20 is further opened, the grate 120, and hence grate 164 through connection 176, is raised again instead of being allowed to return to its lowered position. This situation is illustrated in FIG. 8 wherein the endgate 20 is fully opened.

Figure 7:
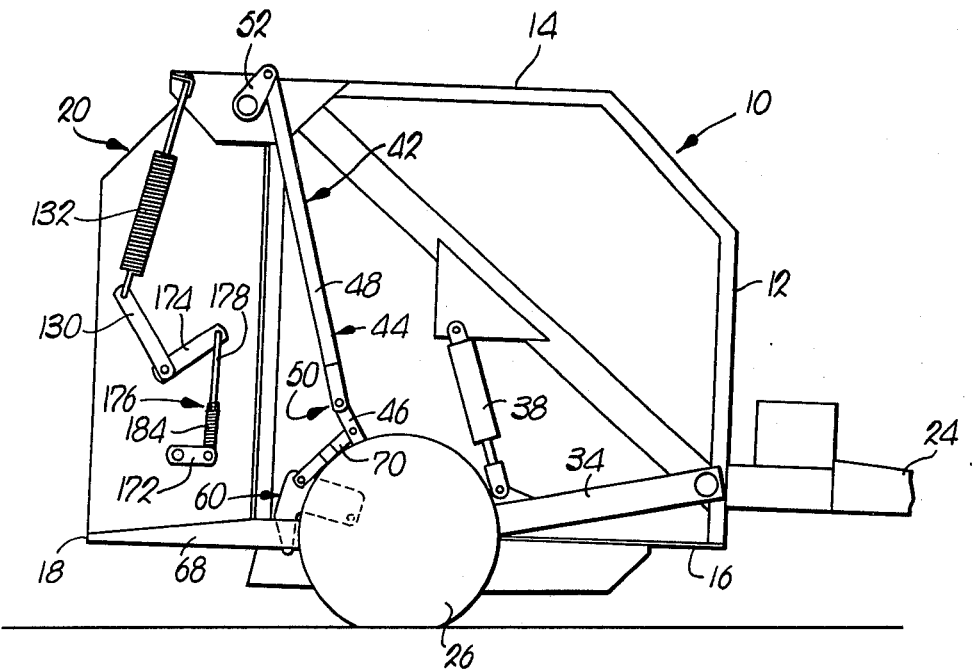
FIG. 7 is a schematic view of the opposite sides of the machine on a reduced scale illustrating the machine in condition for loading.

Retraction of the piston and cylinder assemblies 38 allows the endgate 20 to be lowered back to its fully closed position, whereupon the linkages 44 once again become buckled as the latches 60 are reinserted into their slots 66. Further retraction of piston and cylinder assemblies 38 lowers the housing 10 to its working position as shown in FIG. 1. However, in the event that it is desired to travel with the machine over the road, it is preferable that housing 10 remain in a slightly raised position as shown in FIG. 7, at which time the linkages 48 remain slightly buckled and latches 60 remain within their slots 66. This maintains the lifters 108 sufficiently above the surface of the ground to avoid any accidental contact with structures which might damage tines 112.

Having thus described the invention, what is claimed as new and desired to be secured by Letters Patent is:

1. In a machine for forming round bales by rolling a mass of hay along a ground surface covered with loose hay:
   a mobile, open bottom housing;
   mechanism at the rear of said housing for picking up loose hay through said open bottom as the housing passes over the hay;
   a pair of oppositely extending, upwardly concave, front and rear forming elements disposed in overlapping relationship to one another ahead of said mechanism and defining an arcuately topped, expandable forming chamber for the hay mass as the latter is rolled into a bale,
   said rear element being upwardly and rearwardly swingable under resistance about an axis transverse to the normal path of travel of the housing to maintain yieldable pressure against the upper rear portion of the bale as it progressively grows in size,
   said front element being mounted for upward and forward swinging under resistance about a transverse axis that is shiftable forwardly during growth of the bale to maintain yieldable pressure against the upper forward portion of the bale as it progressively grows in size; and
   a second rear forming element in said chamber underlying the first mentioned rear element in vertically spaced relationship thereto for initiating rolling of the hay mass as the latter accumulates from said mechanism,
   said second rear element being upwardly concave and being upwardly and rearwardly swingable under resistance independently of said first-mentioned rear element about a transverse axis below that of said first-mentioned rear element to confine and apply yieldable pressure against the mass alone until the latter swings the second rear element upwardly to said first-mentioned rear element.

2. In a machine as claimed in claim 1, wherein said housing includes an endgate swingable between a closed position for bale formation and an opened position for bale discharge, said first-mentioned rear element being provided with means for limiting its return from a fully raised position during swinging of the endgate to said opened position, said endgate being provided with apparatus for holding said second element with said first-mentioned element during said limiting of the return of the first-mentioned element.

3. In a machine as claimed in claim 2, wherein said elements are provided with shafts defining the respective transverse, swinging axes thereof, said apparatus including a spring-loaded connection between said shafts for allowing the shaft of said second rear element to rotate in one direction under resistance relative to the shaft of the first-mentioned rear element, said connection including a stop limiting independent rotation of the shaft of said second rear element in the opposite direction.

4. In a machine as claimed in claim 3, wherein said shafts are each provided with a crank, said connection joining said cranks.

* * * * *